US009569959B1

(12) United States Patent
Sprague

(10) Patent No.: US 9,569,959 B1
(45) Date of Patent: Feb. 14, 2017

(54) PREDICTIVE ANALYSIS FOR THREAT DETECTION

(71) Applicant: Michael W. Sprague, Richardson, TX (US)

(72) Inventor: Michael W. Sprague, Richardson, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 176 days.

(21) Appl. No.: 13/633,754

(22) Filed: Oct. 2, 2012

(51) Int. Cl.
*G06F 19/00* (2011.01)
*G08G 1/01* (2006.01)

(52) U.S. Cl.
CPC .................................. *G08G 1/0104* (2013.01)

(58) Field of Classification Search
CPC ............ G08G 1/096775; G08G 1/0112; G08G 1/0141; G08G 1/052
USPC .......... 701/117, 119; 348/148, 159; 340/905, 340/933
See application file for complete search history.

(56) References Cited

U.S. PATENT DOCUMENTS 7,403,988 B1 * 7/2008 Blouin ................ H04L 12/2602 370/230
7,427,930 B2 * 9/2008 Arnold .................... G01S 13/04 340/933
2001/0040514 A1 * 11/2001 Horber .................. G01S 7/4802 340/933
2002/0145541 A1 * 10/2002 Matsui ................. G07B 15/063 340/934
2007/0005227 A1 * 1/2007 Sutardja ............... G08G 1/0104 701/117
2010/0253541 A1 * 10/2010 Seder .................... G01S 13/723 340/905
2011/0246210 A1 * 10/2011 Matsur ................... G06Q 10/06 705/1.1
2011/0273568 A1 * 11/2011 Lagassey ............... G07C 5/008 348/159
2012/0053823 A1 * 3/2012 Wilson ................. G08G 1/0104 701/119
2013/0006510 A1 * 1/2013 Young .................. G08G 1/0104 701/119
2013/0049987 A1 * 2/2013 Velusamy ............ G08G 1/0112 340/905
2013/0073141 A1 * 3/2013 Smith ................ G05B 23/0254 701/32.9
2013/0100286 A1 * 4/2013 Lao .................... G06K 9/00785 348/148
2013/0289821 A1 * 10/2013 Nakagawa .......... B60L 11/1861 701/31.4

(Continued)

OTHER PUBLICATIONS

ASW Sensors, Aircraft and Weapons, www.navair.navy.mil/index.cfm?fuseaction=home.display&key=C8AEF3CE-30B0-4C3D-829C-50FEF, retrieved Sep. 6, 2012, 3 pages.

(Continued)

*Primary Examiner* — Shardul Patel
(74) *Attorney, Agent, or Firm* — Donna P. Suchy; Daniel M. Barbieri

(57) ABSTRACT

Systems and methods for threat detection include receiving data regarding a vehicle currently detected in the area. One or more characteristics of the currently detected vehicle may be compared to a model of previously detected vehicles. Based on the comparison, the one or more characteristics of the currently detected vehicle may be determined to be anomalous.

17 Claims, 6 Drawing Sheets

(56) References Cited

U.S. PATENT DOCUMENTS

2014/0195138 A1* 7/2014 Stelzig ................. G08G 1/0116
701/119

OTHER PUBLICATIONS

Chart 18651, www.charts.noaa.gov/OnLineViewer/18651.shtml, Apr. 2006 Edition, 1 page.
Detecting Outliers Powerpoint, SW388R7 Data Analysis & Computers II, Feb. 28, 2003, 44 pages.
K-Means Clustering, en.wikipedia.org/wiki/K-means_clustering, retrieved on Sep. 19, 2012, 10 pages.
KNEEN, Coast Guard Operations Specialists Get Their Wings, Nov. 22, 2007, 2 pages.
Logistic Regression, en.wikipedia.org/wiki/Logistic_regression, accessed Sep. 10, 2012, 18 pages.
Milcom Monitoring Post, US Coast Guard Asset Guide 013 Part 4, mt-milcom.blogspot.com/2007/09/us-coast-guard-asset-guide-part-4.html, Jul. 29, 2010, 22 pages.

* cited by examiner

PREDICTIVE ANALYSIS FOR THREAT DETECTION

BACKGROUND

The present disclosure relates generally to threat detection systems and methods. More particularly, the present application relates to threat detection systems and methods that model and predict potential maritime threats.

Maritime traffic may take any number of different forms ranging from recreational vehicles to commercial vessels. For example, a multitude of oil tankers, cargo ships, cruise ships, ferries, private boats, personal watercraft, and other such seafaring vessels may be located in San Francisco Bay, at any given time. In some cases, traffic in a harbor or other coastal area may be governed by a nautical chart. In the United States, for example, the National Oceanic and Atmospheric Administration (NOAA) publishes nautical charts for all coastal areas in the United States. Nautical charts typically provide mariners with information regarding the depth of a given area, the location of buoys and other marks, and the area's usage type. For example, a certain portion of San Francisco Bay may be a security zone in which only certain vessels may traverse (e.g., the area outside of an airport), another portion may be regulated, while a further portion may be unregulated.

Naval and law enforcement forces may employ the use of sensors to monitor maritime traffic. For example, an aircraft flying over a particular area may use radar and other forms of sensors to detect maritime vessels in the area. In another example, buoys and other nautical markers may be outfitted with sensors to detect nearby vessels. Generated sensor data may be transmitted to a command and control center for further review. For example, the sensor data may be processed to present a two or three-dimensional display of the area to a trained specialist. The specialist may review the representation of the area to determine whether a threat exits (e.g., a potential attack by hostile forces, a terrorist threat, etc.).

Despite the current advances in detecting sea-based threats, modern threat detection systems are still susceptible to human error. In a heavy traffic area, for example, a specialist may be overwhelmed by the sheer volume of vessels in the area. In addition, bandwidth may also be limited between a sensor's location (e.g., airborne, surface-based, etc.) and the command and control center at which the traffic is analyzed. Applicant has discovered that there may be a need for threat detection systems and methods that use maritime traffic models to rapidly detect potential threats.

SUMMARY

One embodiment of the present disclosure relates to a method for monitoring traffic in an area. The method includes receiving, at processing electronics, data regarding a vehicle currently detected in the area, the data including one or more characteristics of the currently detected vehicle. The method also includes comparing, by the processing electronics, the one or more characteristics of the currently detected vehicle to a model, the model being based on one or more characteristics of vehicles previously detected in the area. The method further includes determining, by the processing electronics, the one or more characteristics of the currently detected vehicle to be anomalous based on the comparison. The method yet further includes providing, by the processing electronics, an indication of the currently detected vehicle having one or more anomalous characteristics.

Another embodiment of the present disclosure relates to a system for monitoring traffic in an area. The system includes processing electronics configured to receive data regarding a vehicle currently detected in the area, the data including one or more characteristics of the currently detected vehicle. The processing electronics are also configured to compare the one or more characteristics of the currently detected vehicle to a model, the model being based on one or more characteristics of vehicles previously detected in the area. The processing electronics are further configured to determine the one or more characteristics of the currently detected vehicle to be anomalous based on the comparison. The processing electronics are yet further configured to provide an indication of the currently detected vehicle having one or more anomalous characteristics.

A further embodiment of the present disclosure relates to a computer-readable storage medium having instructions stored therein, the instructions being executable by a processor to cause the processor to perform operations. The operations include receiving data regarding a vehicle currently detected in the area, the data including one or more characteristics of the currently detected vehicle. The operations also include comparing the one or more characteristics of the currently detected vehicle to a model, the model being based on one or more characteristics of vehicles previously detected in the area. The operations further include determining the one or more characteristics of the currently detected vehicle to be anomalous based on the comparison. The operations yet further include providing an indication of the currently detected vehicle having one or more anomalous characteristics.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION

Referring generally to the Figures, threat detection systems and methods are disclosed. In various embodiments, a threat detection system may receive sensor data from one or more sources regarding maritime traffic. The system may use the traffic patterns to train a predictive model representing the expected traffic patterns in the area. In some embodiments, the threat detection system may classify the different forms of maritime traffic. For example, smaller, private vessels may be classified differently than larger, commercial vessels. Potential threats may be detected by the system by comparing the current traffic patterns to the predictive model. An indication of outliers and other anomalies may be provided by the system to alert a military or law enforcement specialist of the deviant traffic patterns. In some embodiments, abnormalities may be detected at a computing device local to the sensor and an indication of a detected abnormality may be communicated to a remote location for review. Although a maritime setting is used herein as an example for purposes of illustrating the detection of maritime or airborne threats, the systems may also be used to detect potential threats from any other form of vehicle (e.g., land-based vehicles, space-based vehicles, etc.), in further embodiments.

Figure 1:
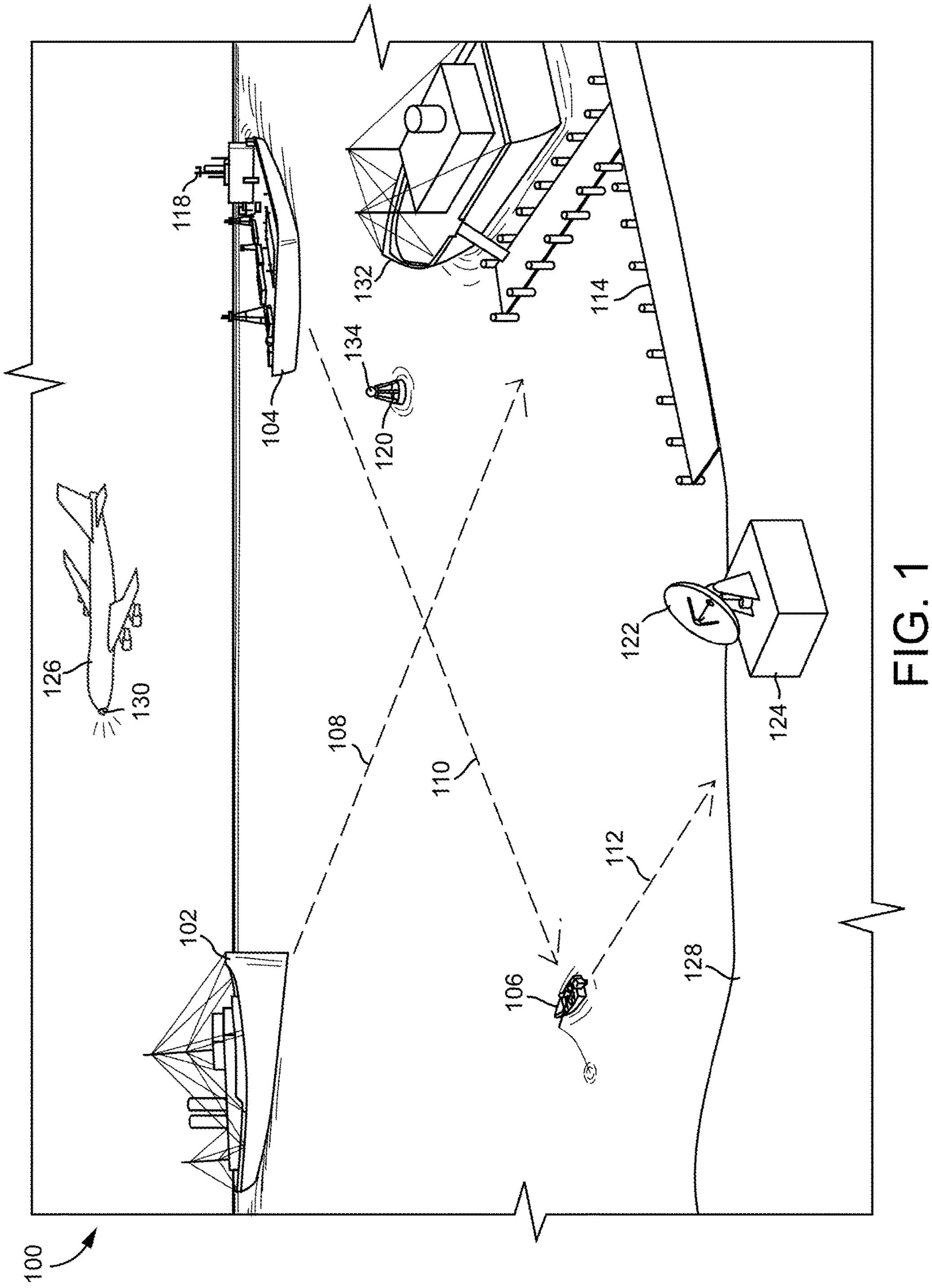
FIG. 1 is an illustration of a maritime location, according to an exemplary embodiment.

Referring now to FIG. 1, an illustration of a maritime area 100 is shown, according to an exemplary embodiment. In some embodiments, maritime area 100 may be a coastal area adjacent to a stretch of land 128. For example, maritime area 100 may be a natural or man-made harbor, an estuary, a river, a strait, or other littoral area. In other embodiments, maritime area 100 may be a location farther offshore from land 128, such as in the middle of an ocean, sea, or lake.

Various maritime vehicles may be located throughout maritime area 100. Exemplary maritime vehicles include, but are not limited to, commercial transport vessels (e.g., cargo ships, oil tankers, etc.), passenger ships (e.g., ferries, cruise ships, etc.), fishing boats, military and law enforcement ships, private boats (e.g., row boats, sail boats, etc.), and personal water craft (e.g., jet skis). As shown, a commercial vessel 104, passenger ships 102, 132, and a private boat 106 are located in maritime area 100. Each of commercial vessel 104, passenger ships 102, 132, and private boat 106 may have differing sizes, shapes, and propulsion capabilities. For example, passenger ship 102 may be a slow moving cruise ship, while passenger ship 132 may be a high speed ferry. In another example, private boat 106 may have a length of twelve feet while commercial vessel 104 may be an oil tanker with a length greater than seven hundred and fifty feet.

The maritime vehicles located in maritime area 100 may be stationary or may travel along a particular track. As shown, commercial vessel 104 may travel along track 110, passenger ship 102 may travel along track 108, and private boat 106 may travel along track 112. A vehicle may be stationary or near stationary (e.g., due to currents, tides, and waves of maritime area 100) by being tied to a mooring, anchor, or to a dock. For example, passenger ship 132 may be stationary and attached to a dock 114 (e.g., to allow passengers to board and debark). In another example, a fisherman located on private boat 106 may drop anchor for a period of time in maritime area 100 to fish from a stationary location.

Various sensors may also be located throughout maritime area 100. The sensors located in maritime area 100 may be configured to detect the presence, size, track, altitude, or speed of vehicles located in maritime area 100 (e.g., maritime vehicles or aircraft). Sensors may include, but are not limited to, sensors that employ radar, sonar, lidar, infrared, motion detection, cameras (e.g., video or still-motion), and other sensing techniques. Sensors located in maritime area 100 may include airborne sensors (e.g., sensors located on an aircraft), sensors located on the surface of maritime area 100 (e.g., sensors located on a buoy or boat), sensors located below the surface of maritime area 100 (e.g., sensors located on the seabed or suspended below the surface of the water), or sensors located on land 128. In the example shown, sensors 134 may be located on a buoy 120, sensors 122 may be located on a land-based station 124, and sensors 130 may be located on an aircraft 126 flying over maritime area 100. For example, sensors 130 of aircraft 126 may include a radar system that directs a radar beam towards the surface of maritime area 100. The radar system may then perform horizontal and/or vertical radar sweeps over the surface maritime area 100, to detect the presence of maritime vessels and other features of maritime area 100. Radar returns from the sweeps may be received and processed by the radar system to discern differences between open water, open airspace, and vehicles in maritime area 100. Data representing the radar returns can be received as sensor data, in one embodiment. Other forms of data that may be received as sensor data may include sonar, lidar, video, images, etc.

In one embodiment, sensor data may also include self-reported data received from a vehicle. As shown, commercial vessel 104 may include communications equipment 118 that reports information about commercial vessel 104 to other vehicles in the area or monitoring equipment in the area. The data may be communicated in response to receiving a request for the data. For example, station 124 may request data regarding the characteristics of commercial vessel 104 via communications equipment 118. In response, communications equipment 118 may communicate information regarding the speed, heading, national origin, etc., of commercial vessel 104 to station 124. In another embodiment, communications equipment 118 may broadcast information about commercial vessel 104, without first receiving a request for the data. In a further embodiment, communications equipment 118 may be part of a collision detection and avoidance system in which vehicles broadcast data regarding their respective speed, heading, altitude, etc. to nearby vehicles.

Sensor data may be communicated from the various sensor locations to a central location for further processing and analysis. For example, station 124 may serve as a command and control center for monitoring maritime area 100. In such a case, sensor data from buoy 120 or aircraft 126 may be communicated to station 124. Data communicated between buoy 120, aircraft 126, and station 124 may be sent wirelessly or over a wired connection, in various embodiments. For example, aircraft 126 and station 124 may communicate wirelessly over a radio or satellite communications channel. In another example, buoy 120 may communicate with station 124 via a fiber optic or other wired connection or wirelessly via a radio or satellite channel. Processing electronics located at station 124 may then aggregate and analyze the received sensor data to provide a view of maritime area 100 to an electronic display.

In some embodiments, sensor data generated by sensors 122, 130, 134 may be used by processing electronics to train a predictive model. In general, the predictive model may use data regarding the location, size, speed, altitude, or track of maritime or other vehicles to model the typical characteristics of a vehicle located in a particular area of maritime area 100. For example, sensor data that includes video may be analyzed using image recognition to determine a vehicle's speed, size, etc. Current sensor data may then be compared with the model to determine whether a detected vehicle deviates from the expected characteristics of a vehicle in that location. In one embodiment, a detected vehicle may be deemed an abnormality if its characteristics differ from the model by an amount greater than a statistical threshold. For example, a vehicle may be deemed an outlier by the processing electronics if its size, speed, altitude, or track differs from the model for a particular area of maritime area 100. An indication of the detected abnormality may then be provided to a user interface device, such as an electronic display, to alert a user monitoring maritime area 100.

A predictive model may be used by processing electronics located at the same location as a sensor and an indication of a detected abnormality may be communicated to a remote location for review. For example, processing electronics located on board aircraft 126 may use a predictive model to analyze sensor data from sensor 130. If an abnormality is detected, aircraft 126 may communicate an indication of the detected vehicle and its characteristics to a remote monitoring station, such as station 124. In one embodiment, aircraft 126 may not send data to station 124 regarding detected vehicles that follow the predictive model. Such an implementation may reduce the amount of bandwidth needed between aircraft 126 and station 124, in contrast to implementations in which aircraft 126 relays all sensor data from sensor 130 to station 124.

Figure 2:
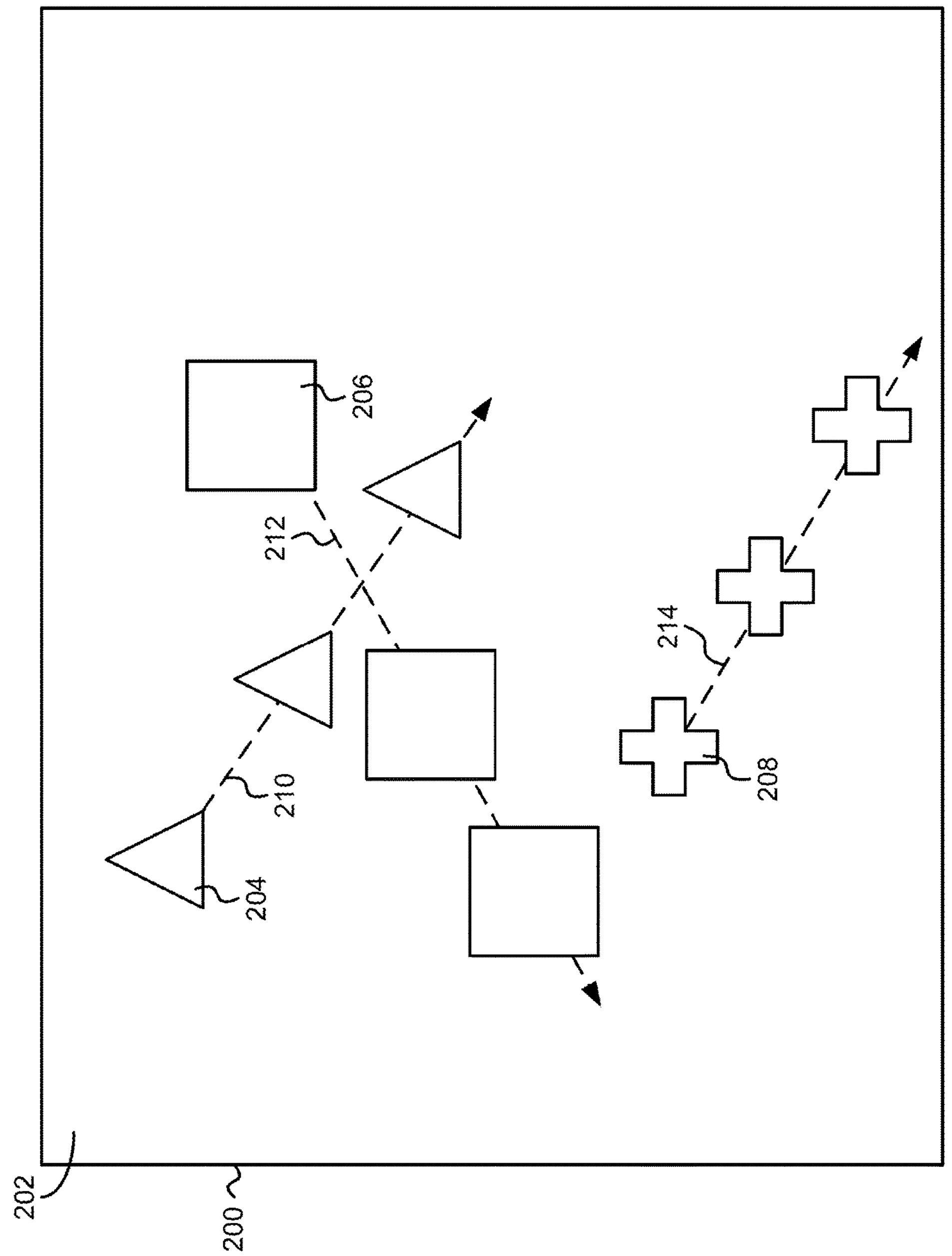
FIG. 2 is an illustration of an electronic display displaying maritime traffic, according to an exemplary embodiment.

Referring now to FIG. 2, an illustration is shown of an electronic display 200 displaying maritime traffic, according to an exemplary embodiment. Electronic display 200 may be in electronic communication with processing electronics configured to receive and analyze sensor data relating to a maritime area. In the example shown, a screen 202 displayed on electronic display 200 may depict the traffic patterns of boats located in maritime area 100 of FIG. 1. A technician, specialist, or other user may review screen 202 to assess the vehicles detected in maritime area 100. For example, military personnel may review screen 202 to monitor to the boats and other water craft located in maritime area 100.

Sensor data from sensors in maritime area 100 may be used to generate screen 202. In one embodiment, screen 202 may include information regarding the location, size, altitude, speed, or track of a vehicle detected in maritime area 100. Detected vehicles may be represented as symbols, text, numbers, or other forms of graphical indicia. As shown, symbols 204, 206, 208 on screen 202 represent passenger ship 102, commercial vessel 104, and private boat 106, respectively. Symbols 204, 206, 208 may be of any form or graphical shape. In one embodiment, symbols 204, 206, 208 may be sized in proportion to their corresponding vehicles. For example, symbol 206 may be larger than symbol 208, since commercial vessel 104 is larger than private boat 106. In another embodiment, the size of the vehicles may be depicted via text or images on screen 202 (e.g., the sensed dimensions of commercial vessel 104 may be listed as text in conjunction with symbol 206). Similarly, the altitude or velocity of a detected vehicle may be provided on screen 202 using text or other indicia. For example, symbols 204, 206, 208 may have different colorations based on their corresponding vehicles' altitude or speed.

Screen 202 may be configured also to provide an indication of a detected vehicle's track. As shown, track 108 of passenger ship 102 may be represented on screen 202 as the corresponding track 210 of symbol 204. Track 110 of commercial vessel 104 may be presented on screen 202 as the corresponding track 212 of symbol 206. Additionally, track 112 of private boat 106 may be represented on screen 202 as track 214. In one embodiment, trajectories 210, 212, 214 may be depicted explicitly on screen 202. For example, track 210 may be shown on screen 202 as a displayed line. Each of the displayed lines may have different indicia to distinguish one track from another (e.g., via different colorations, different dashes or dots, by repeating the corresponding symbol along the track, etc.). In other embodiments, trajectories may be displayed implicitly on screen 202 by refreshing screen 202 periodically with the new locations of symbols 204, 206, 208.

In one embodiment, screen 202 may include information about all traffic in the represented area. In many cases, however, the characteristics of a vehicle may be typical for the vehicle's location. In one example, assume that commercial vessels, such as commercial vessel 104, typically travel along a track that is similar to track 110. For example, commercial vessels may typically travel in maritime area 100 along a commercial shipping channel. Commercial vessels traveling along such a track may also have a large average size and a slow average speed in comparison to other vehicles in maritime area 100. Therefore, if the characteristics of commercial vessel 104 are within the normal characteristics of vehicles in its location, presentation of information regarding commercial vessel 104 on screen 202 (e.g., displayed symbol 206, track 212, etc.) may be extraneous to a user for purposes of detecting threats. In high traffic areas, for example, presentation of all traffic and the vehicles' characteristics on screen 202 may overwhelm a user of screen 202 or detract from the user's ability to spot potential threats.

Figure 3:
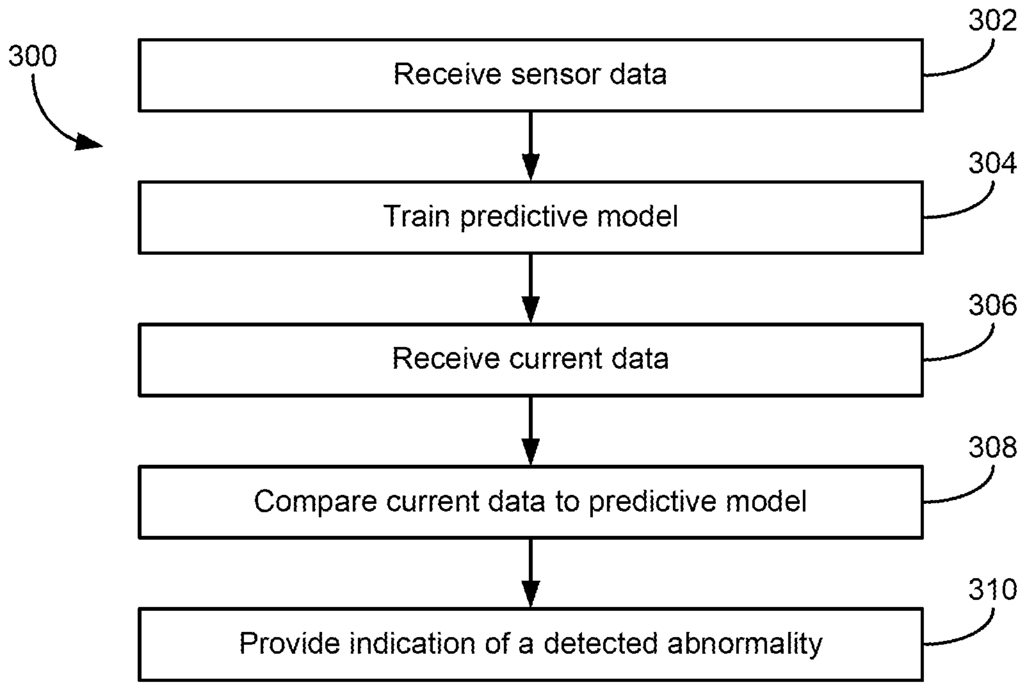
FIG. 3 is a flow chart of a process for detecting a potential threat, according to an exemplary embodiment.

Referring now to FIG. 3, a flow chart of a process 300 for detecting a potential threat is shown, according to an exemplary embodiment. Process 300 generally allows for potential threats to be detected by an area monitoring system through the use of a predictive model. Characteristics of vehicles operating normally in the area may be used to train the model, which can then be used to evaluate the vehicles that are currently in the area. Abnormal vehicles that do not conform to the model may then be flagged as potential threats for further review. In various embodiments, process 300 may be implemented by one or more computing devices configured to store machine instructions that, when executed by one or more processing devices, cause the one or more processors to perform process 300.

Process 300 includes receiving sensor data regarding vehicles in an area (step 302). The received sensor data may include data regarding any number of characteristics of a vehicle. Exemplary characteristics may include, but are not limited to, a vehicle's location, size, shape, velocity, make, model, country of origin (e.g., based on the vehicle's markings, flag, etc.), altitude, and direction of movement. In one embodiment, a characteristic of a vehicle may be calculated using the sensor data. For example, a vehicle's velocity may be determined by calculating the difference in its sensed location over time. In other embodiments, some or all of the characteristics of a vehicle may be self reported. For example, a vehicle in the monitored area may communicate its characteristics to a remote location periodically or in response to receiving a request for such data.

The sensor data may be generated by any number of forms of sensors located through the monitored area. Sensor locations may include aerial locations (e.g., a sensor may be on board an aircraft in the area, land-based locations, locations on the surface of the water, or locations below the surface of the water). In various embodiments, a sensor system may use radar, infrared, motion detection, radio, sonar, or light detection, to generate the sensor data. For example, an aircraft flying over the monitored area may perform radar sweeps to detect vehicles in the area and determine characteristics of the vehicles. In another example, a sensor located on the surface or below the surface of a body of water may use sonar to detect vehicles in the area and determine characteristics of the vehicles. In a further example, a camera may capture images of the area, to detect the presence of vehicles in the area.

Process 300 includes training a predictive model (step 304). In some embodiments, sensor data generated over a period of time may be used to train a predictive model. In general, a predictive model may model one or more expected characteristics of a vehicle located in a particular location of the monitored area. According to various embodiments, the predictive model may be a Bayesian classification model, a logistic regression model, a neural network, a cluster model, or any other form of predictive model.

In one embodiment, a vehicle detected in the area may be represented in a cluster model by representing the vehicle as an n-dimensional vector of the vehicle's characteristics. For example, a detected vehicle may be represented as a five dimensional vector where each dimension represents the vehicle's location, speed, size, altitude, and direction of movement, respectively. Vectors generated in this way may be used to form clusters using a classification technique, such as a centroid-based technique (e.g., k-means clustering, etc.), hierarchical classification technique, distribution-based classification technique, density-based classification technique, or other such classification technique. For example, detected vehicles within a thirty meter radius of a particular location may have an average speed of ten knots, an average length of fifty feet, and a heading of 30° from magnetic north. In such a case, these averages may be used to define the centroid of the cluster.

In one example of cluster analysis, k-means clustering may be used to generate the predictive model. Such a technique operates to classify n-number of observations into k-number of clusters. The technique begins by determining k-number of means $\{m_1 \ldots m_k\}$. Each observation is assigned to the cluster having the nearest mean (e.g., centroid) as follows:

$$S_i^{(t)}=\{x_p:\|x_p-m_i^{(t)}\|\le\|x_p-m_j^{(t)}\|\forall 1\le j\le k\}$$

where $x_p$ is an observation and $S_i$ is a set of observations in a cluster having a unique set of associated observations (e.g., each observation is assigned to one cluster). After the assignment, the centroids of the clusters may be updated as follows:

$$m_i^{(t+1)} = \frac{1}{|S_i^{(t)}|}\sum_{x_j\in S_i^{(t)}} x_j$$

where $m_i$ is the calculated mean (e.g., centroid) of a cluster. The cluster assignment and mean update steps may be repeated iteratively until the cluster assignment no longer change between iterations.

In other embodiments, the model may be formed using linear or logistic regression on the characteristics of the detected vehicles in the training set of sensor data. For example, the characteristics of the vehicles may be used to generate a logistic regression model that predicts the direction of motion for a vehicle based on its location, size, etc. In general, a logistic regression function may be defined as follows:

$$f(z) = \frac{1}{1+e^{-z}}$$

where f(z) represents the probability of an outcome, given a set of factors represented by z. The value of z may be determined as follows:

$$z=\beta_0+\beta_1x_1+\beta_2x_2+\ldots+\beta_kx_k$$

where $\beta_0$ is the y-axis intercept, $x_i$ is a characteristic affecting the probability outcome, and $\beta_i$ is a regression coefficient (e.g., how much $x_i$ affects the outcome). Training of the logistic regression model may be achieved by using the characteristics of the detected vehicles in the training set of data. In other words, the speed, size, direction, or any other characteristic of a detected vehicle may be used from the training set of data. For example, a slow-moving, large vessel may have a much higher probability of being located in a shipping lane than in an area that allows anchoring.

Process 300 includes receiving current sensor data (step 306). The sensor data may be received from the same or similar sensors as those used to train the predictive model. For example, radar sweeps of an area that are made at a first point in time may be used to train the predictive model. At a later point in time, radar sweeps may be made of the same area and received by processing electronics. For purposes of threat detection, the received sensor data should be the most currently taken sensor measurements of the monitored area. In various embodiments, the current sensor data may be received in real-time, near real-time, or with a minimal time delay from when the sensor measurements were taken. For example, the current sensor data may be received for purposes of threat detection within a second, minute, or minutes of the corresponding sensor measurements being taken.

Process 300 includes comparing the current sensor data to the predictive model (step 308). Characteristics of any vehicles detected using the current sensor data may generally be compared to those used in the predictive model, to assess whether a detected vehicle is a potential threat or requires additional attention. In general, the predictive model may be used to determine whether the detected vehicle has characteristics that are abnormal when compared to the predictive model. For example, the typical vehicle in an area may be large moving and slow. If the vehicle detecting the same area is small and fast moving, it may be identified as being an outlier.

Depending on the type of predictive model used, the characteristics of a detected vehicle may be compared to the model in a variety of ways. In some embodiments, a mean of one or more of the characteristics may be compared to that of a detected vehicle. For example, a standard score may be determined for the detected vehicle based on the training data (e.g., the number of standard deviations the detected vehicle is above or below the mean of the model's data). A standard score may be used in univariate cases where a single type of characteristic is compared (e.g., the detected vehicle's size is compared to those in the model). In another embodiment, multivariate outlier detection may be used (e.g., a set of different types of characteristics of the vehicle may be compared to those in the model). For example, the size, speed, and heading of a vehicle may be treated as a single set of data and compared to the averages in the model. A distance measurement from the mean may be used in a similar manner for multivariate analysis as a standard score in a univariate comparison. For example, a Mahalanobis or Gaussian distance may be determined from the mean of the characteristics used in the predictive model. In embodiments in which cluster analysis is used, such a distance may be determined between the characteristics of the detected vehicle and the nearest cluster centroid. A standard score or distance value may be compared to a threshold, to determine whether the vehicle is an outlier. For example, a detected vehicle having a characteristic that is 2.5 or more standard deviations from the mean may be identified as an abnormality.

In embodiments in which a regression model is used to predict a vehicle's behavior, the comparison may be made by comparing the predicted characteristics to the vehicle's actual characteristics. In other words, the comparison may include determining a measure of how well the regression model is able to predict the characteristics of the detected vehicle. For example, assume that 99% of the vehicles detected in a particular area and used to train the model have lengths greater than seven hundred feet long. Thus, the predictive model may predict that the next vessel detected in the area will also have a length greater than seven hundred feet long. However, assume that the vehicle currently detected in the area is only twenty feet long. In such a case, the vehicle may be determined to be an abnormality.

Process 310 includes providing an indication of a detected abnormality (step 310). In some embodiments, the indication may be provided to a user interface device, such as an electronic display, a speaker, etc. For example, the indication of the detected anomaly may be provided to electronic display 200 shown in FIG. 2. In further embodiments, the indication may be provided to a remote device for review or further analysis. For example, a central monitoring station may validate whether an anomaly exists using sensor data from several locations.

In one embodiment, anomaly detection may be implemented at the various locations of the sensors. Implementing anomaly detection at the location of a sensor instead of at a central location may reduce the overall bandwidth requirements of the monitoring system (e.g., data may only be communicated to the remote location if an anomaly is detected). For example, an aircraft making radar sweeps of the area may include processing electronics that determine whether a detected vehicle is an anomaly at its location. In such a case, an indication of the detected anomaly may be communicated from the aircraft to a remote location for further review, such as to a remote monitoring station.

Figure 4:
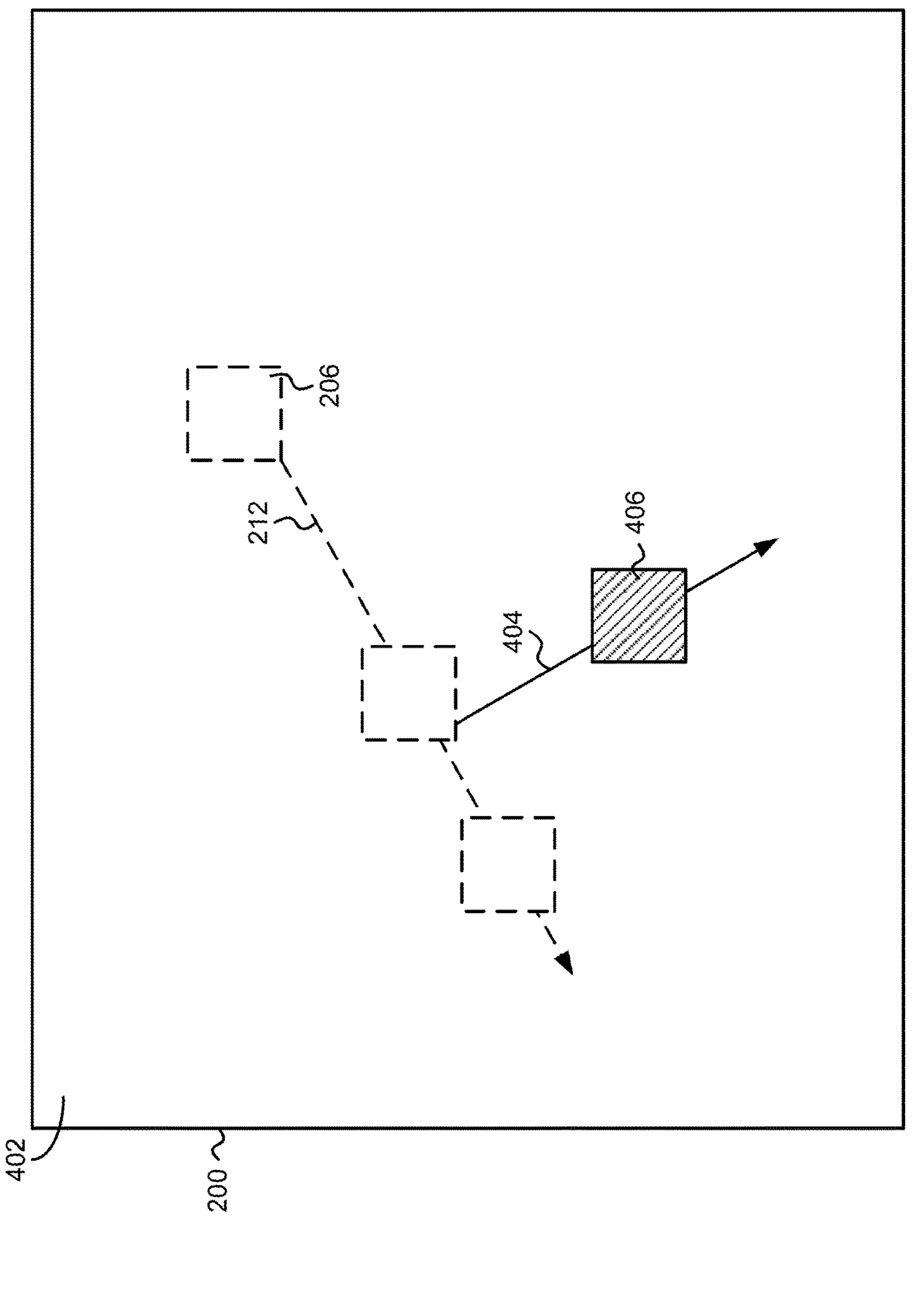
FIG. 4 is an illustration of an electronic display showing a potential maritime threat, according to an exemplary embodiment.

Referring now to FIG. 4, an illustration is shown of electronic display 200 showing a potential maritime threat, according to an exemplary embodiment. In the example shown, the same sensor data used to generate screen 202 is also used to generate screen 402 (e.g., both screens 202 and 402 display data regarding the same detected vehicles). In screen 402, however, data regarding vehicles having characteristics that fall within a normal range are not displayed, allowing a specialist to concentrate on detected vehicles that have characteristics outside of their predicted ranges. For example, symbols 204, 208 and tracks 210, 214 may be omitted from screen 402 based on a determination that the characteristics of passenger ship 102 and private boat 106 are within the predicted ranges for their respective locations.

As shown, assume that the characteristics of commercial vessel 104 are within their predicted ranges while commercial vessel travels along track 110. In such a case, symbol 206 and track 212 may also be omitted from screen 410. However, assume that commercial vessel 104 suddenly changes its heading along a track 404. If this change in direction differs from the predicted heading by greater than a threshold amount, commercial vessel 104 may be identified as being an anomaly. Based on this determination, an indication of the detected abnormality may be displayed on screen 402, to alert the specialist to the abnormal condition.

Screen 402 may include any number of different forms of indicia to convey to a user that an anomaly has been detected, such as a symbol 406 to represent commercial vessel 104. The size, shape, or coloration of symbol 406 may be based on the abnormal characteristic, in various embodiments. For example, symbol 406 may be colored red if the speed of commercial vessel 104 is abnormally high or low for its location. In another example, symbol 406 may be in a square shape if commercial vessel is abnormally large for its current location. Track 404 may also be displayed on screen 402, to denote the current track of commercial vessel 104. Similar to symbol 406, track 404 may include an associated coloration or pattern, to denote that track 404 is anomalous. In one embodiment, screen 402 may also include data regarding the expected characteristics of the anomalous vehicle. For example, screen 402 may display symbol 206 and track 212 in addition to symbol 406 and track 404, allowing a user to visually determine how the heading of commercial vessel 104 is anomalous.

Figure 5:
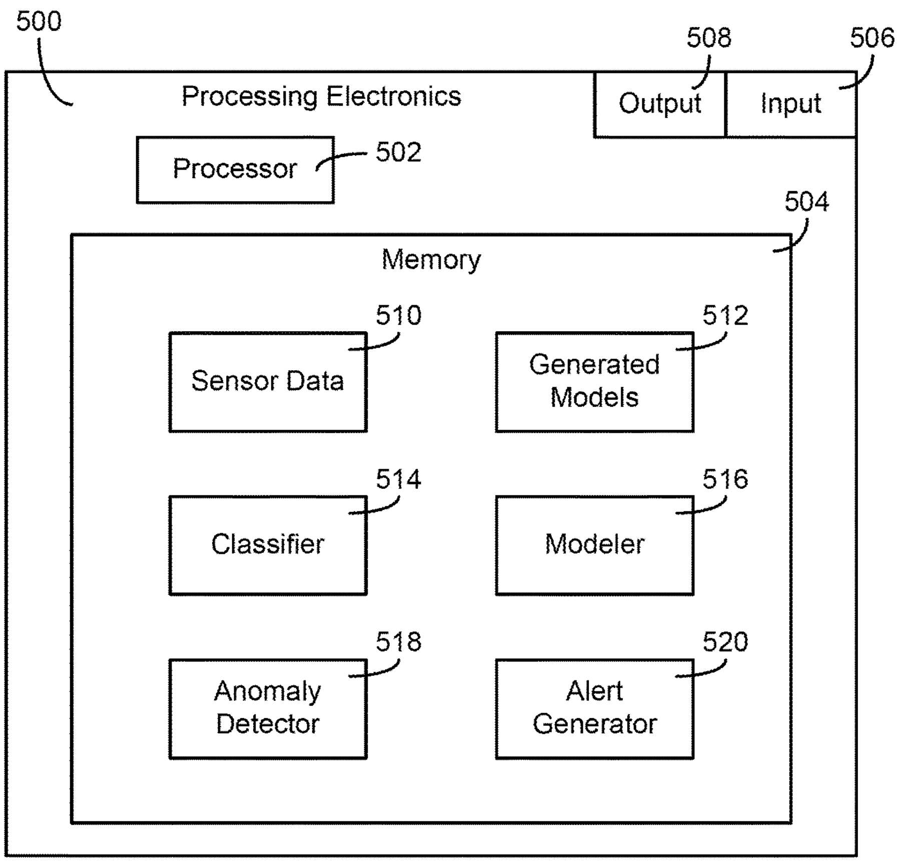
FIG. 5 is a general schematic block diagram of processing electronics configured to detect an anomalous vehicle, according to an exemplary embodiment.

Referring now to FIG. 5, a detailed block diagram of processing electronics 500 is shown, according to an exemplary embodiment. Processing electronics 500 includes a memory 504 and processor 502. Processor 502 may be, or may include, one or more microprocessors, an application specific integrated circuit (ASIC), a circuit containing one or more processing components, a group of distributed processing components, circuitry for supporting a microprocessor, or other hardware configured for processing. According to an exemplary embodiment, processor 502 is configured to execute computer code stored in memory 504 to complete and facilitate the activities described herein. Memory 504 can be any volatile or non-volatile computer-readable storage medium capable of storing data or computer code relating to the activities described herein. For example, memory 504 is shown to include modules 514-520 which are computer code modules (e.g., executable code, object code, source code, script code, machine code, etc.) configured for execution by processor 502. When executed by processor 502, processing electronics 500 is configured to complete the activities described herein.

Processing electronics includes hardware circuitry for supporting the execution of the computer code of modules 514-520. For example, processing electronics 500 includes hardware interfaces (e.g., output 508) for communicating data (e.g., analog or digital signals) from processing electronics 500 to user interface devices (e.g., display 200, a speaker, etc.) or other computing devices (e.g., a server, a personal computer, a hand-held electronic device, etc.). Processing electronics 500 may also include an input 506 for receiving, for example, data from user interface devices (e.g., a keyboard, a touch screen display, a microphone, etc.), or other systems (e.g., sensors, other processing electronics, etc.). For example, processing electronics 500 may receive sensor data 510 via input 506 directly from a sensor or indirectly from other processing electronics, according to various embodiments.

Sensor data 510 stored in memory 504 may include any form of raw or processed data received from sensors deployed to a monitored area. Exemplary sensors data may include, but is not limited to, data generated by deployed sensors that use radar, infrared, global positioning, motion detection, radio, sonar, or light detection. In one embodiment, raw sensor data 510 may be received by processing electronics 500 directly from one or more of the sensors. For example, processing electronics 500 may be in electronic communication with a radar system that performs radar sweeps of a given area. In such a case, sensor data 510 may include radar return data received from the radar system. In another embodiment, sensor data 510 may include sensor data that has been processed by other processing electronics. For example, sensor data 510 may include data regarding the speed of a detected vehicle in the area. Such a value may be determined directly by a sensor or may be determined by other processing electronics that calculate the change in the vehicle's location over time. In various embodiments, calculations regarding any of sensor data 510 may be made locally by processing electronics 500 or may be received via input 506 from one or more other processing electronics that perform such calculations.

Sensor data 510 may include data from any time period. In one embodiment, sensor data 510 may include sensor data from a monitored area over a historical period of time (e.g., greater than a day, greater than a week, greater than a month, greater than a year, etc., from the current time). Historical sensor data may be used, for example, by a modeler 516 to generate baseline traffic models 512. Sensor data 510 may also include current sensor data regarding the current or recent state of the monitored area (e.g., real-time sensor data, sensor data received within the past few seconds, minutes, data, etc.). Generally, the recent data in sensor data 510 may be used by an anomaly detector 518 to compare the characteristics of any detected vehicles in the area to the baseline models 512 generated by modeler 516.

Sensor data 510 may include any form of data regarding the characteristics of a vehicle detected in the monitored area. Exemplary characteristics may include, but are not limited to, the vehicle's location, size, shape, speed, direction of movement, altitude, national affiliation, length of time while stationary, type, and submerged volume. For example, sensor data 510 may include data regarding a detected aircraft, boat, or submarine in the area.

Memory 504 may include a classifier 514 configured to determine similarities among vehicles indicated in sensor data 510. Classifier 514 may classify detected vehicles by any of the vehicles' characteristics or temporally. For example, classifier 514 may classify one detected vehicle as being a personal boat and another as being a commercial shipping vessel. In another example, classifier 514 may classify sensor data 510 based on when the corresponding vehicles were detected in the monitored area. In one embodiment, classifier 514 may be used by modeler 516 to generate different models 512 for the corresponding groups. For example, maritime traffic patterns in the morning may differ from maritime traffic patterns in the evening. In such a case, classifier 514 may classify the historical sensor data 510 as belonging to either of these two groups. Classifier 514 may also be used by anomaly detector 518 to classify sensor data 510 for any of the currently detected vehicles in the area. For example, a classification of a vehicle currently in the area may be used by anomaly detector 518 to select which of generated models 512 is to be used.

Modeler 516 may be configured to use historical sensor data 510 to generate one or more models 512 that model the characteristics of vehicles located within the monitored area. Modeler 516 may use any form of machine learning or statistical analysis to generate models 512. In various embodiments, modeler 516 may use univariate statistical analysis, multivariate statistical analysis, a regression technique (e.g., logistic regression, linear regression, etc.), cluster analysis, or another form of modeling technique to generate models 512. For example, modeler 516 may represent each detected vehicle from the historical sensor data 510 as a multidimensional vector of characteristics. Based on these vectors, each vehicle may be assigned to a corresponding cluster by modeler 516. The determined clusters, as well as their corresponding centroids, may be stored by modeler 516 in generated models 512.

Generated models 512 may include any statistics or model parameters determined by modeler 516. For example, generated models 512 may include data regarding the mean or centroid of characteristics for a set of detected vehicles. In another example, generated models 512 may include regression coefficients determined by modeler 516. In one embodiment, each of generated models 512 may belong to one or more classifications determined by classifier 514. For example, one of the generated models 512 may correspond to a model of traffic behavior for commercial shipping vessels in the morning.

Anomaly detector 518 is configured to compare one or more characteristics of a vehicle currently detected in the area to one or more of the generated models 512. Depending on the prediction or modeling technique used by modeler 516, anomaly detector 518 may determine a distance value for the detected vehicle or an error value for a predictive model in models 512. For example, anomaly detector 518 may determine the standard score (e.g., for a univariate characteristic), Gaussian distance, or Mahalanobis distance between the vehicle's characteristic and the mean or centroid of the model in generated models 512. Anomaly detector 518 may determine whether a predictive model in generated models 512 is able to correctly predict one or more characteristics of the vehicle. For example, a model in generated models 512 may predict that a detected vehicle will maintain a predicted heading. If the vehicle's actual heading is significantly different from the predicted, anomaly detector 518 may determine the vehicle to be an anomaly.

In some embodiments, anomaly detector 518 may use one or more threshold values to determine whether an anomaly exists. For example, a characteristic of a vehicle having a standard score greater than 2.5 above or below the mean may be determined by anomaly detector 518 to be an anomaly. Similarly, a predicted characteristic that differs greater than a threshold amount from the vehicle's actual characteristic may be used by anomaly detector 518 to identify the vehicle as being an anomaly. Threshold values may be predetermined, manually determined (e.g., based on input from a user interface device), or automatically determined. For example, a user may specify the degree of sensitivity of anomaly detector 518 by manually setting a threshold value. In another example, anomaly detector 518 may use a feedback loop to automatically adjust a threshold value (e.g., the loop may adjust the threshold value to avoid false positives).

Memory 504 may also include an alert generator 520 configured to generate an indication that an anomaly has been detected by anomaly detector 518. Anomaly detector 518 may utilize alert generator 520 to notify another device (e.g., a user interface device, other processing electronics, etc.) that an anomaly has been detected. The indication generated by alert generator 520 may include some or all of the corresponding sensor data 510 for the vehicle, the anomalous characteristic of the vehicle detected by anomaly detector 518, or data regarding a normal or expected characteristic based on models 512. For example, alert generator 520 may generate and provide display data to an electronic display via output 508 that graphically depicts an anomalous vehicle.

In other embodiments, the functions of processing electronics 500 may be implemented as part of a distributed computing system. For example, historical sensor data 510 and modeler 516 may reside on a different device than processing electronics 500. In such a case, the other device may simply provide the generated models 512 to processing electronics 500 (e.g., the models may be predetermined and installed in memory 504). In distributed implementations, therefore, processing electronics 500 may instead represent the collective processing electronics that perform the functions described herein (e.g., processor 502 may represent the collective processors of the system and memory 504 may represent the collective data storage devices of the system).

Figure 6:
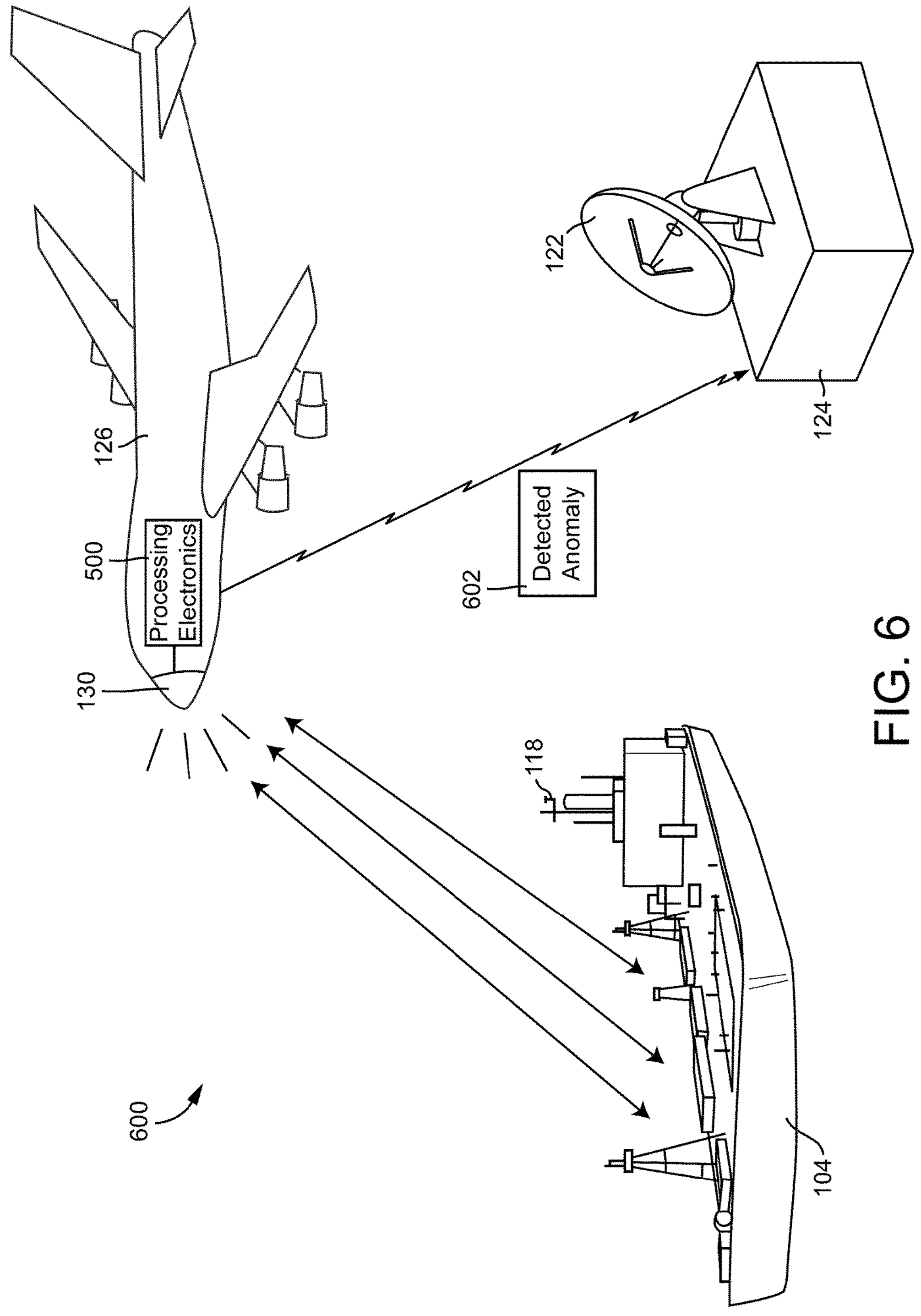
FIG. 6 is an illustration of an indication of a detected anomaly being provided to a remote location, according to an exemplary embodiment.

Referring now to FIG. 6, an illustration 600 of an indication of a potential threat being provided to a remote location is shown, according to an exemplary embodiment. Processing electronics 500 may be part of aircraft 126 and in communication with sensor 130, which is also located on aircraft 126. To conserve bandwidth, processing electronics 500 may only provide sensor data 130 to station 124 in response to a request for such data or in response to an anomaly being detected by processing electronics 500. In other words, processing electronics 500 may process the sensor data from sensor 130 and determine whether a detected vehicle, such as commercial vessel 104, has an anomalous characteristic. Other sensors deployed to the monitored area may also include similar processing electronics as processing electronics 500, allowing anomaly detection to occur partially or fully at the location of the sensors (e.g., at buoy 120, etc.).

If processing electronics 500 detects an anomalous vehicle in the monitored area, processing electronics 500 may provide indication 602 to station 124. Indication 602 may include data regarding the anomalous characteristic of commercial vessel 104 (e.g., its heading), other characteristics of commercial vessel 104 (e.g., its size, type, speed, etc.), or data regarding why the characteristic is anomalous (e.g., the typical heading for shipping vessels located in the area). Indication 602 may then be received by a computing device in station 124 and used to provide information to a user interface device, such as a display of the monitored area. The computing device may, in some embodiments, combine data received from any number of sources (e.g., aircraft 126, buoy 120, etc.) to provide a combined view of the monitored area.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of automatically monitoring traffic in an area, the method comprising:

automatically receiving, at processing electronics, vehicle data from a sensor in response to the sensor currently detecting a vehicle in an area, the vehicle data regarding the currently detected vehicle and including one or more characteristics of the currently detected vehicle;

classifying, by the processing electronics, the vehicle data and historical sensor data, the historical sensor data indicative of a plurality of heterogeneous vehicles previously detected in the area, the historical sensor data classified into at least two groups based on one or more characteristics of the previously detected vehicles, each group including at least two heterogeneous vehicles;

generating, by the processing electronics, at least one model for each of the at least two groups, the at least one model for each group representing typical characteristics of the plurality of heterogeneous vehicles previously detected in the area, the at least one model based on the one or more characteristics of the plurality of heterogeneous vehicles previously detected in the area;

selecting, by the processing electronics, a model from the at least two models based in part on the classification of the vehicle data;

comparing, by the processing electronics, the one or more characteristics of the currently detected vehicle to the selected model;

determining, by the processing electronics, the one or more characteristics of the currently detected vehicle to be anomalous based on a comparison of the one or more characteristics of the currently detected vehicle to the selected model; and providing, by the processing electronics, display data to a display system that causes the display system to display an indication of the currently detected vehicle having one or more anomalous characteristics.

2. The method of claim 1, further comprising:

receiving, at the processing electronics, historical sensor data indicative of the one or more characteristics of the vehicles previously detected in the area; and generating the model using the historical sensor data.

3. The method of claim 2, wherein the model is a regression model.

4. The method of claim 2, wherein the model is generated by determining a centroid of the one or more characteristics of the vehicles previously detected in the area.

5. The method of claim 1, wherein the one or more characteristics of the currently detected vehicle comprise one or more of: a size of the vehicle, a location of the vehicle, a speed of the vehicle, an altitude of the vehicle, or a national affiliation of the vehicle.

6. The method of claim 1, wherein the indication comprises a display screen excluding currently detected vehicles that are not determined to be anomalous.

7. A system for automatically monitoring traffic in an area comprising processing electronics configured to:

automatically receive vehicle data from a sensor in response to the sensor currently detecting a vehicle in an area, the vehicle data regarding the currently detected vehicle and including one or more characteristics of the currently detected vehicle;

classify the vehicle data and historical sensor data, the historical sensor data indicative of a plurality of heterogeneous vehicles previously detected in the area, the historical sensor data classified into at least two groups based on one or more characteristics of the previously detected vehicles, each group including at least two heterogeneous vehicles;

generate at least one predictive model for each of the at least two groups, the at least one predictive model for each group representing an expected traffic pattern in the area, the predictive model based on one or more characteristics of the plurality of heterogeneous vehicles previously detected in the area;

select a predictive model from the at least two models based in part on the classification of the vehicle data;

compare the one or more characteristics of the currently detected vehicle to the selected predictive model;

determine the one or more characteristics of the currently detected vehicle to be anomalous based on a comparison of the one or more characteristics of the currently detected vehicle to the selected predictive model; and provide display data to a display system that causes the display system to display an indication of the currently detected vehicle having one or more anomalous characteristics.

8. The system of claim 7, wherein the processing electronics are further configured to:

receive historical sensor data indicative of the one or more characteristics of the vehicles previously detected in the area; and generate the predictive model using the historical sensor data.

9. The system of claim 8, wherein the predictive model is a regression model.

10. The system of claim 8, wherein the predictive model is generated by determining a centroid of the one or more characteristics of the vehicles previously detected in the area.

11. The system of claim 7, wherein the one or more characteristics of the currently detected vehicle comprise one or more of: a size of the vehicle, a shape of the vehicle, an altitude of the vehicle, or a national affiliation of the vehicle.

12. The system of claim 7, wherein the indication comprises a display screen excluding currently detected vehicles that are not determined to be anomalous.

13. A non-transitory computer-readable storage medium having instructions stored therein, the instructions being executable by a processor to cause the processor to perform operations, the operations comprising:

automatically receiving vehicle data from a sensor in response to the sensor currently detecting a vehicle in an area, the vehicle data regarding the currently detected vehicle and including one or more characteristics of the currently detected vehicle;

classifying the vehicle data and historical sensor data, the historical sensor data indicative of a plurality of heterogeneous vehicles previously detected in the area, the historical sensor data classified into at least two groups based on one or more characteristics of the previously detected vehicles, each group including at least two heterogeneous vehicles;

generating at least one model for each of the at least two groups, the at least one model for each group based on the one or more characteristics of the plurality of heterogeneous vehicles previously detected in the area;

selecting a model from the at least two models based in part on the classification of the vehicle data;

comparing the one or more characteristics of the currently detected vehicle to the selected model;

determining the one or more characteristics of the currently detected vehicle to be anomalous based on a comparison of the one or more characteristics of the currently detected vehicle to the selected model; and providing display data to a display system that causes the display system to display an indication of the currently detected vehicle having one or more anomalous characteristics;

wherein the currently detected vehicle and the plurality of heterogeneous vehicles previously detected in the area are maritime vehicles.

14. The non-transitory computer-readable storage medium of claim 13, wherein the operations further comprise:

receiving historical sensor data indicative of the one or more characteristics of the vehicle previously detected in the area; and generating the model using the historical sensor data.

15. The non-transitory computer-readable storage medium of claim 13, wherein one characteristic of the one or more characteristics of the currently detected vehicle is a national affiliation of the vehicle.

16. The non-transitory computer-readable storage medium of claim 13, wherein the indication comprises indicia on a display screen excluding currently detected vehicles in the area that are determined not to be anomalous.

17. The non-transitory computer-readable storage medium of claim 16, wherein the indicia on the display screen comprises at least one of a coloration, a shape, or text corresponding to the one or more anomalous characteristics.

* * * * *